US012606254B2

(12) United States Patent
Salter et al.

(10) Patent No.: US 12,606,254 B2
(45) Date of Patent: Apr. 21, 2026

(54) CONDUCTIVE MOTOR VEHICLE PAINT ENABLING WIND DRAG REDUCTION

(71) Applicant: Ford Global Technologies, LLC, Dearborn, MI (US)

(72) Inventors: Stuart C. Salter, White Lake, MI (US); Darren Palmer, Dearborn, MI (US); Paul Kenneth Dellock, Northville, MI (US); Katherine Howard-Cone, Canton, MI (US); Kevin Howard, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 843 days.

(21) Appl. No.: 17/873,721

(22) Filed: Jul. 26, 2022

(65) Prior Publication Data

US 2024/0034417 A1 Feb. 1, 2024

(51) Int. Cl.

| | |
|---|---|
| *B62D 29/04* | (2006.01) |
| *B62D 35/00* | (2006.01) |
| *C09D 5/08* | (2006.01) |
| *C09D 5/24* | (2006.01) |
| *C09D 7/61* | (2018.01) |
| *C09D 123/14* | (2006.01) |

(52) U.S. Cl.
CPC ........... *B62D 29/043* (2013.01); *B62D 35/00* (2013.01); *C09D 5/08* (2013.01); *C09D 5/24* (2013.01); *C09D 7/61* (2018.01); *C09D 123/14* (2013.01)

(58) Field of Classification Search
None
See application file for complete search history.

(56) References Cited

U.S. PATENT DOCUMENTS

| | | | | |
|---|---|---|---|---|
| 4,793,867 A | * | 12/1988 | Charles | C23C 22/362 |
| | | | | 148/262 |
| 6,248,225 B1 | * | 6/2001 | Palaika | C08G 18/0814 |
| | | | | 524/591 |
| 8,960,596 B2 | | 2/2015 | Kremeyer | |
| 9,067,674 B2 | | 6/2015 | Nordin et al. | |
| 10,207,664 B2 | | 2/2019 | Tanahashi et al. | |
| 10,336,270 B2 | | 7/2019 | Yamada et al. | |
| 10,549,683 B1 | * | 2/2020 | Salter | B60Q 1/323 |
| 10,703,423 B2 | | 7/2020 | Han et al. | |
| 10,704,323 B2 | | 7/2020 | Chen | |
| 2005/0029498 A1 | * | 2/2005 | Elkovitch | H01B 1/24 |
| | | | | 252/500 |
| 2015/0197583 A1 | * | 7/2015 | Meka | C08F 210/06 |
| | | | | 524/451 |
| 2019/0299887 A1 | | 10/2019 | Sudo et al. | |

FOREIGN PATENT DOCUMENTS

| | | |
|---|---|---|
| WO | 2021255517 | 12/2021 |

OTHER PUBLICATIONS

Grosse, et al., Parametric investigation of the fluid mechanic performance of an AC dielectric barrier discharge plasma actuator, Journal of Physics D: Applied Physics, Aug. 11, 2020, 14 pages, vol. 53, Open Access, IOP Publishing Ltd, United Kingdom.
Sorensen K. et al., Thermodynamics of a carbon nano-materials based icing protection system for unmanned aerial vehicle, IEEE Aerospace Conference, Mar. 2016, pp. 1-3.

* cited by examiner

*Primary Examiner* — Cheng Yuan Huang

(74) *Attorney, Agent, or Firm* — Burris Law, PLLC

(57) ABSTRACT

A motor vehicle body component includes a substrate, at least one corrosion protection layer disposed on the substrate, a basecoat layer disposed on the at least one corrosion protection layer, and a clearcoat layer disposed on the basecoat layer. The clearcoat layer includes a material having a conductive network of linked nanostructures and also defines a Class A surface finish.

18 Claims, 5 Drawing Sheets

60

CONDUCTIVE MOTOR VEHICLE PAINT ENABLING WIND DRAG REDUCTION

FIELD

The present disclosure relates to motor vehicles, and more particularly to improvement in aerodynamics through the use of surface coatings.

BACKGROUND

The statements in this section merely provide background information related to the present disclosure and may not constitute prior art.

The demand for battery electric vehicles (BEVs) has increased rapidly in recent years. With this increased demand, the number and location of battery charging locations has also been on the rise. However, with a variety of road conditions and weather challenges, drivers of BEVs are continuously conserving power to increase their range.

Further, with combustion engine powered vehicles and hybrid vehicles, fuel consumption has recently become more of a concern with rising gas prices. Additionally, motor vehicles are increasingly subjected to various emissions and fuel consumption standards. These standards are typically promulgated to lower carbon dioxide emissions, thereby reducing greenhouse gas in the atmosphere. One way to meet these standards is to improve the aerodynamics of motor vehicles to improve both fuel efficiency and battery range.

These challenges related to the conservation of power to increase the range of BEVs, as well as fuel economy of combustion engine powered vehicles, are addressed by the present disclosure.

SUMMARY

This section provides a general summary of the disclosure and is not a comprehensive disclosure of its full scope or all of its features.

In one form, a motor vehicle body component is provided that comprises a substrate, a basecoat layer disposed on or above the substrate, and a clearcoat layer disposed on the basecoat layer. The clearcoat layer comprises a material having a conductive network of linked nanostructures, and the motor vehicle body component defines a Class A surface finish.

In variations of this form, which may be implemented individually or in any combination: at least one corrosion protection layer is disposed on the substrate and a primer layer is disposed on the at least one corrosion protection layer, wherein the basecoat layer is disposed on the primer layer; the at least one corrosion protection layer comprises an E-Coat material; the at least one corrosion protection layer further comprises a phosphate layer disposed on the substrate, wherein the E-Coat material is disposed on the phosphate layer; the clearcoat layer is configured to receive a positive or negative electrical charge; the motor vehicle body component is selected from the group consisting of a spoiler, a hood, a roof header, side view mirrors, fenders, wheel lip moldings, a grille, fascias, a roof, a bumper, a leaf screen, and a rear tailgate cover; the clearcoat layer further comprises a polymer matrix and a polymer adhesive configured to adhere the conductive network of linked nanostructures to the polymer matrix; the polymer matrix comprises a polypropylene impact copolymer; the polypropylene impact copolymer is in an amount between 25-95 wt. %; and the conductive network of linked nanostructures are in an amount between 0.25 wt. % and 4 wt. %.

In another form of the present disclosure, a motor vehicle body component comprises a substrate, a primer layer disposed on or above the substrate, a basecoat layer disposed on the primer layer, and a clearcoat layer disposed on the basecoat layer. The clearcoat layer comprises a material having a conductive network of linked nanostructures and the motor vehicle body component defines a Class A surface finish. Further, the primer layer adheres the basecoat layer to a layer beneath the primer layer.

In variations of this form, which may be implemented individually or in any combination: the clearcoat layer is configured to receive a positive or negative electrical charge; the motor vehicle body component is selected from the group consisting of a spoiler, a roof header, side view mirrors, fenders, wheel lip moldings, a grille, fascias, a roof, a bumper, a leaf screen, and a rear tailgate cover; the clearcoat further comprises a polymer matrix and a polymer adhesive configured to adhere the conductive network of linked nanostructures to the polymer matrix; and the conductive network of linked nanostructures are in an amount between 0.25 wt. % and 4 wt. %.

In yet another form of the present disclosure, a system for controlling aerodynamic drag of, or airflow around, a motor vehicle body component comprises a controller and the motor vehicle body component, the motor vehicle body component comprising a substrate, a basecoat layer disposed on or above the substrate, and a clearcoat layer disposed on the basecoat layer. The clearcoat layer comprises a material having a conductive network of linked nanostructures in electrical communication with the controller and configured to receive a positive or negative electrical charge, and the motor vehicle body component defines a Class A surface finish.

In variations of this form, which may be implemented individually or in any combination: at least one corrosion protection layer is disposed on the substrate, the basecoat layer disposed on the at least one corrosion protection layer; the motor vehicle body component is selected from the group consisting of a spoiler, a roof header, side view mirrors, fenders, wheel lip moldings, a grille, fascias, a roof, a bumper, a leaf screen, and a rear tailgate cover; the positive or negative electrical charge is applied to create one of a downward force or an upward force, or one of a low or high pressure, on the motor vehicle body component; and the substrate is electrically conductive and comprises electrical connections.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
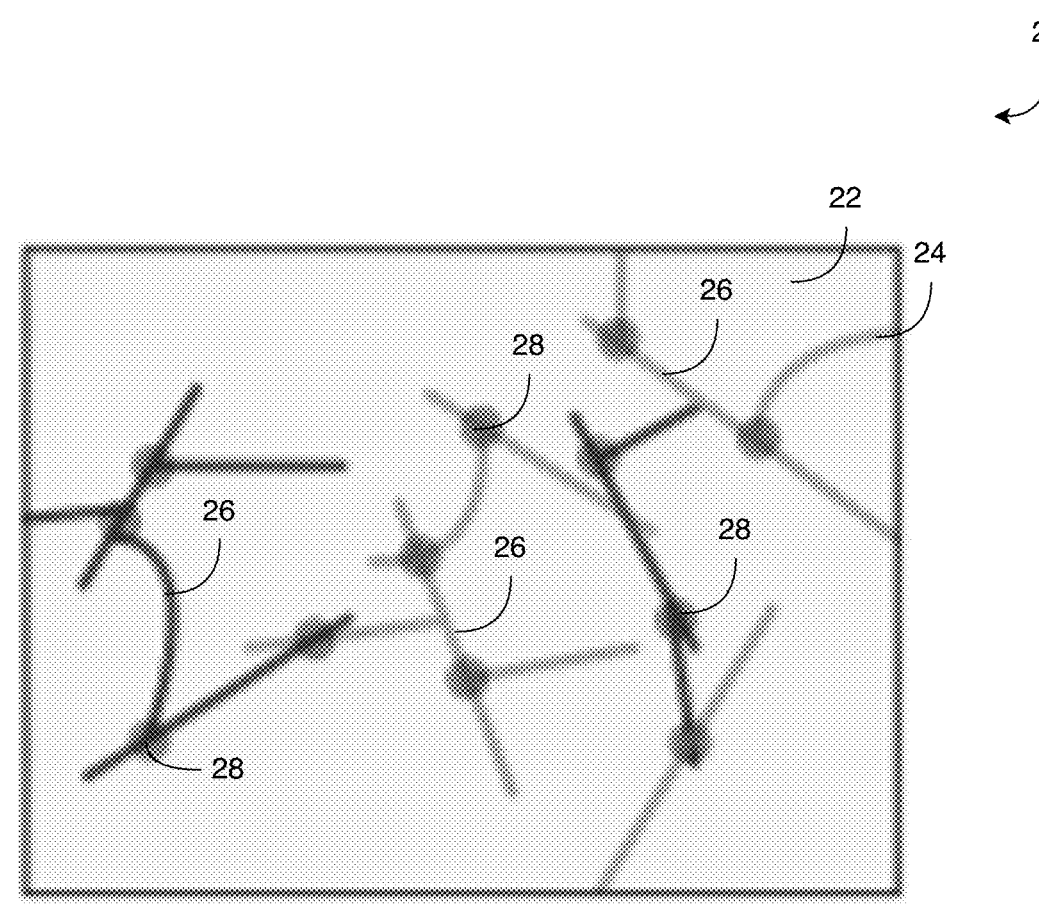
FIG. 1 is a schematic view of an electrically conductive composite material according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a composite material 20 for a vehicle component includes a polymer matrix 22 and a conductive network of linked nanostructures 24 distributed throughout the polymer matrix 22. The composite material further includes a polymer adhesive (not shown) that is configured to adhere the conductive network of linked nanostructures 24 to the polymer matrix 22, as described in greater detail below. In one form, the polymer matrix 22 is a polypropylene impact copolymer in an amount between 25-95 wt. % of the total polymer weight. In another form, the composite material 20 includes only the polymer matrix 22, with no adhesive.

In the form of FIG. 1, the conductive network of linked nanostructures 24 includes a plurality of carbon nanotubes 26 linked to each other at nodes 28. The carbon nanotubes 26 are electrically conductive and thus can transmit electricity through the conductive network of linked nanostructures 24, such that the composite material 20 is electrically conductive. In FIG. 1, only a few of the carbon nanotubes 26 are identified with numerals, and it is understood that the other straight and curved objects linked by the nodes 28 are carbon nanotubes 26. It should be understood that other materials besides carbon nanotubes 26 may be employed to create the conductive network of linked nanostructures 24. For example, boron nitride nanostructures, graphene nanostructures, or other electrically conductive structures and forms (not limited to tubes) may be employed as a part of the conductive network of linked nanostructures 24.

When electricity is transmitted through the conductive network of linked nanostructures 24, the composite material 20 has a positive or negative charge induced by the electric field of the transmitted electricity. Air is typically positively charged, and a positively charged object deflects air away from the object, causing a downward force on the object. A positively charged composite material 20 increases aerodynamic drag, which increases the downward force on a vehicle component to improve handling when, for example, a vehicle turns in a curve. A negatively charged object draws air closer to the object, causing a slipstream that improves air flow across the object. A negatively charged composite material 20 reduces aerodynamic drag, reducing fuel consumption by a vehicle engine and increasing a maximum speed of a vehicle. Selectively electrifying the conductive network of linked nanostructures 24 to induce a positive or negative charge to the composite material 20 can thus improve operation of a vehicle.

In one variation of the present disclosure, to form the composite material 20, carbon nanotube flakes are introduced to a liquid polymer. A shear mixer (not shown) then applies shear forces to the flake-polymer mixture. The shear forces break the flakes into smaller nanotube fragments that form into a larger nanostructure. In one form, low shear forces break the carbon nanotube flakes into individual or small chains of nanotubes 26, and high shear forces move the nanotubes 26 toward each other. The nanotubes 26 then link at nodes 28 to form the conductive network of linked nanostructures 24. In one form, the composite material 20 is a transparent liquid coating, such as a clearcoat paint, that is applied to vehicle components in a clearcoat layer to form a Class A surface to provide the positive or negative charge described above.

Figure 2:
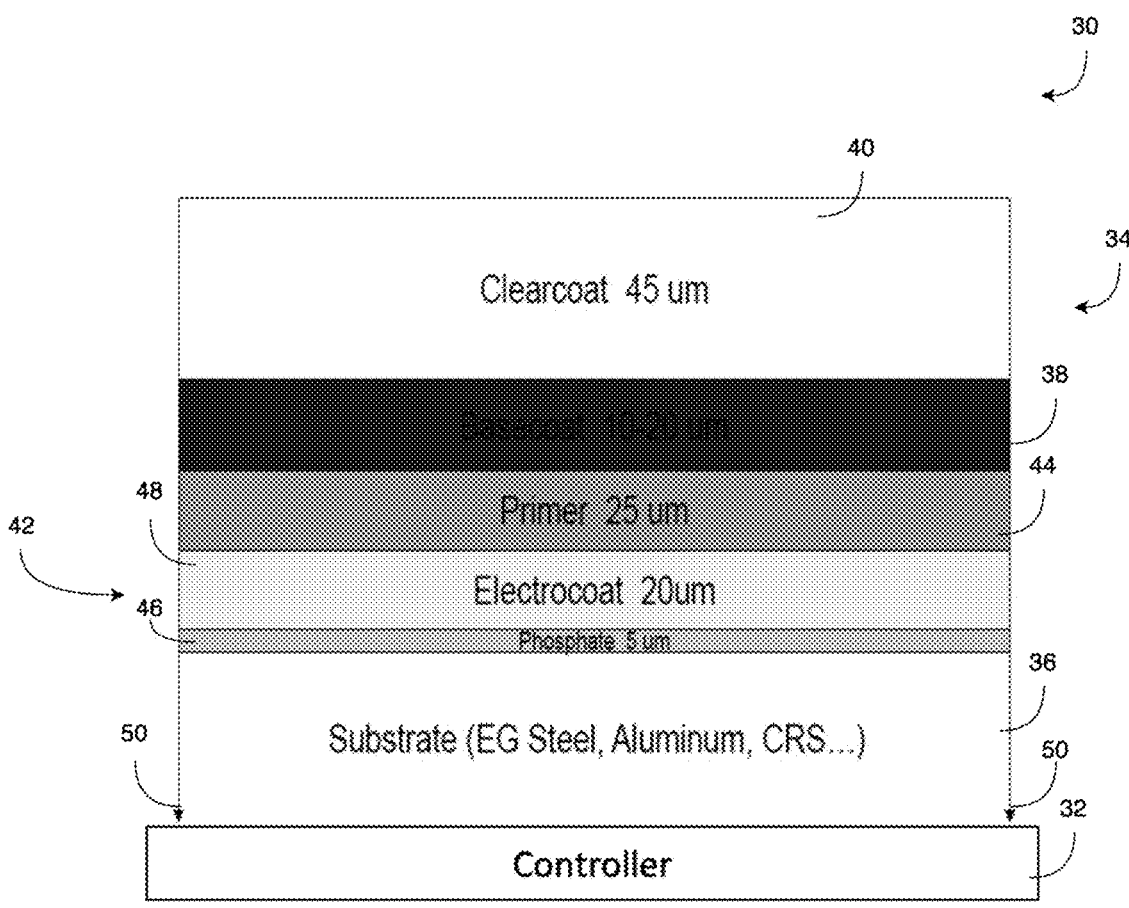
FIG. 2 is a cross-sectional view of a metal component with various coating layers according to the present disclosure.

With reference to FIG. 2, a system 30 for controlling airflow around the vehicle includes a controller 32 and a vehicle component 34. The vehicle component 34 includes a substrate 36, a basecoat layer 38 disposed above the substrate 36, and a clearcoat layer 40 on the basecoat layer 38. The vehicle component 34 may be, by way of example, a spoiler, a hood, a roof header, side view mirrors, fenders, wheel lip moldings, a grille, a fascia, a roof, a bumper, a leaf screen, or a rear tailgate cover, among others. The substrate 36 in the form of FIG. 2 is a metal, such as a steel alloy or an aluminum alloy. Generally, the substrate 36 is a base onto which other layers are applied to provide structural, aesthetic, anti-corrosive, and electrical properties. The substrate 36 may also be a nonmetallic material, such as by way of example, a polymer or a composite material (described in greater detail below), among others, while remaining within the scope of the present disclosure.

The basecoat layer 38 provides aesthetic qualities to the vehicle component 34, such as color and visual texture. In one form, the basecoat layer 38 is a paint that includes metallic flakes that provide a shine effect when viewed. The basecoat layer 38 is designed to be visible through the clearcoat layer 40. The basecoat layer 38 is disposed "above" the substrate 36, i.e., placed in an outward direction relative to the substrate 36 toward a Class A surface. In this illustrated form, additional layers are disposed between the basecoat layer 38 and the substrate 36, such as a corrosion protection layer 42 and a primer layer 44 as described below. In another form not shown, the basecoat layer 38 is applied directly onto the substrate 36.

The clearcoat layer 40 provides the positive or negative charge to the outer surface of the vehicle component 34. The clearcoat layer 40 is the composite material 20 that includes the conductive network of linked nanostructures 24, as described above. In this form, the conductive network of linked nanostructures 24 are not shown for overall clarity of the figure. The clearcoat layer 40 is transparent, i.e., allows visible light to pass therethrough, and thus the color of the basecoat 38 is visible through the clearcoat layer 40. In one form, the polymer of the clearcoat layer 40 has a glossy effect, providing visual shine and smoothness to the vehicle component 34. Advantageously, the clearcoat layer 40 defines a Class-A surface finish, i.e., an outermost visible surface of a vehicle.

In one form, the vehicle component 34 includes at least one corrosion protection layer 42 disposed on the substrate 36, when the substrate 36 is a metal material. The corrosion protection layer 42 reduces corrosion of the metal substrate that may be caused by exposure to light, air, moisture, and other environmental substances. In this form, the corrosion protection layer 42 includes a phosphate layer 46 and an electro-coat (E-coat) material 48. (An "electro-coat" material 48 is a material that is deposited onto a surface by an electrical charge). The phosphate layer 46 is disposed on the substrate 36, and the E-coat material 48 is disposed on the phosphate layer 46. The phosphate layer 46 assists in adhering the E-coat material 48 to the substrate 36. The E-coat material 48 is electrically charged with a specified amount of voltage to act as an anode, and the substrate 36 acts as a cathode. The E-coat material 48 is distributed along the phosphate layer 46 to a specified thickness determined by the specified voltage. The E-coat material 48 hardens into a solid layer, thereby forming a protection layer to the substrate 36. The E-coat material 48 is generally electrically insulating, and thus does not produce the positive or negative charge for the vehicle component 34 to alter the amount of aerodynamic drag experienced by the vehicle component 34.

The vehicle component 34 further includes the primer layer 44 disposed above the substrate 36. The primer layer 44 is a conventional paint primer that improves adhesion of the basecoat layer 38 to a layer beneath the primer layer 44, or directly to the substrate 36. The primer layer 44 illustrated further smooths the surface of the corrosion protection layer 42 to improve adherence of the basecoat layer 38. The primer layer 44 may block at least some light from reaching the E-coat material 48, further improving corrosion protection.

The clearcoat layer 40 and the substrate 36 are electrically connected with electrical connections 50, and the controller 32 provides a voltage or current via the electrical connections 50. The controller 32 selectively provides the voltage or current to provide a positive charge or a negative charge to the clearcoat layer 40, as desired for a particular application or driving condition. The controller 32 is thus in communication with the vehicles electronic control unit(s) (ECUs) or other modules (not shown) of the vehicle as needed to control the positive or negative charge. As described above, the positive charge adjusts the airflow to provide high pressure on the surface of the motor vehicle to increase downforce, thereby improving handling. The negative charge decreases aerodynamic drag on the vehicle component 34, providing a modification to the airflow pressure on the motor vehicle and, subsequently, changes the bluff body wake structure to reduce aerodynamic drag. The decreased aerodynamic drag reduces energy consumption and increases the maximum speed of the vehicle, or vehicle range, due to reduced energy loss to friction from aerodynamic drag.

Although the controller 32 is schematically illustrated beneath the substrate 36, it should be understood that the controller 32 is disposed in a suitable location in the vehicle, or remotely from the vehicle, and communicates with the clearcoat layer 40 and its conductive network of linked nanostructures 24 via the electrical connections 50.

Figure 3:
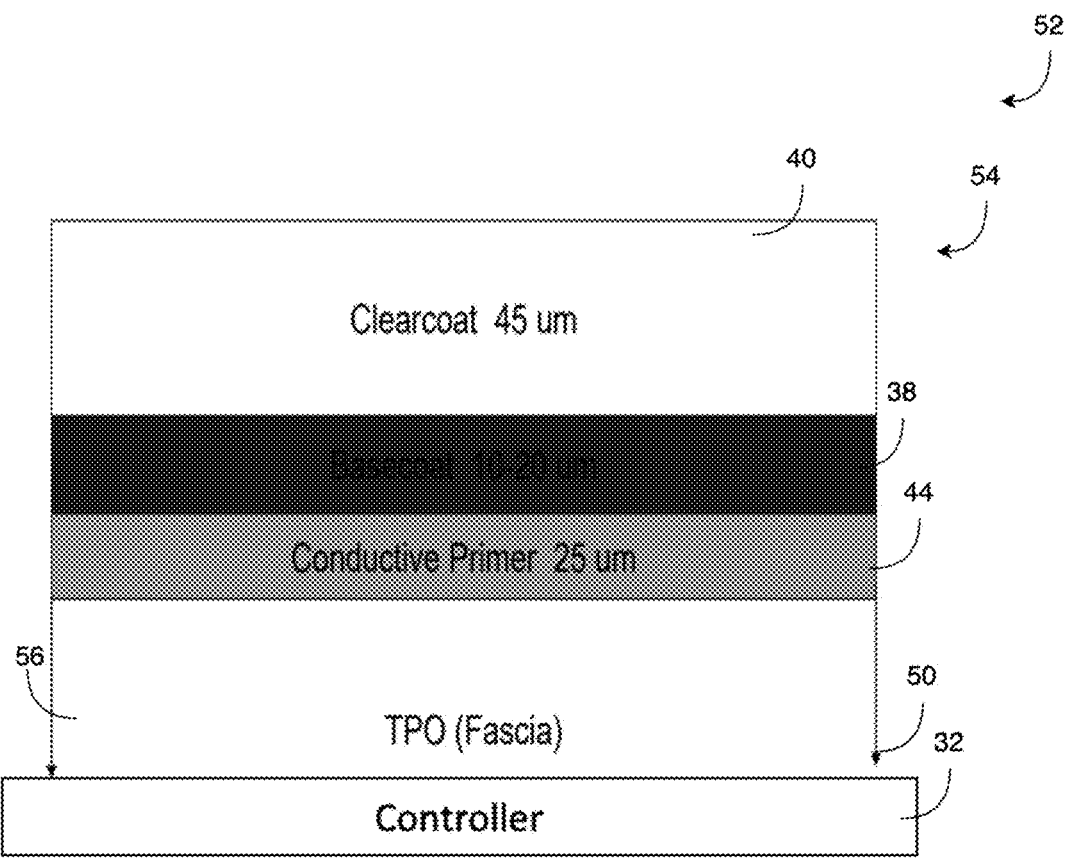
FIG. 3 is a cross-sectional view of a plastic component with various layers according to the present disclosure.

With reference to FIG. 3, another system 52 for controlling aerodynamic drag includes a vehicle component 54 and the controller 32. The vehicle component 54 in this form includes a polymeric (or composite) substrate 56, which is electrically nonconductive, the primer layer 44 disposed on the plastic substrate 56, the basecoat layer 38 disposed on the primer layer 44, and the clearcoat layer 40 disposed on the basecoat layer 38. Because the substrate 56 is not a metal, and is instead a polymeric material, such as a polypropylene or thermoplastic polyolefin (TPO), the vehicle component 54 does not have a corrosion protection layer 42. In this form, the primer layer 44 is a conductive primer that improves adhesion between the plastic substrate 56 and the basecoat layer 40. In another form not shown in the figures, the vehicle component 54 lacks the primer layer 44, and the basecoat layer 38 is disposed directly on the substrate 56. As described above with reference to FIG. 2, the basecoat layer 38 provides aesthetic color and texture to the vehicle component 54, and the clearcoat layer 40 includes the conductive network of linked nanostructures 24 that provide a positive charge or a negative charge upon receiving a voltage or a current from the controller 32 via the electrical connections 50.

Figure 4:
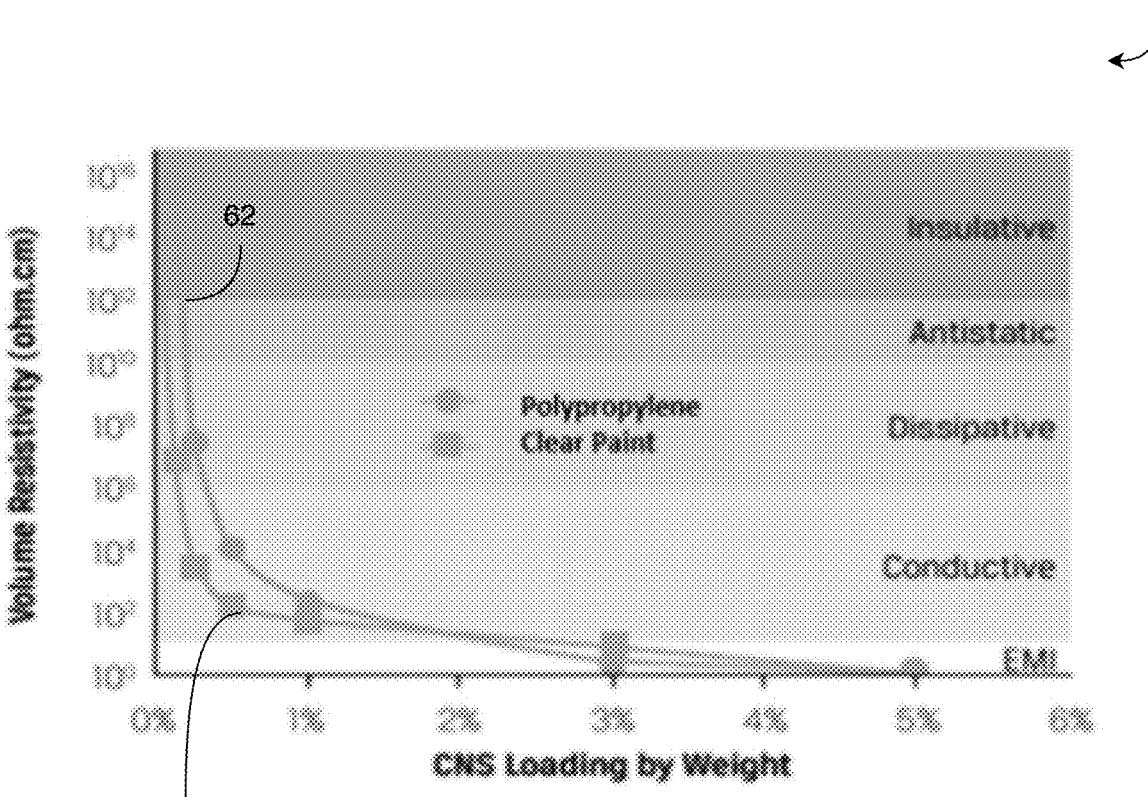
FIG. 4 is a graph illustrating amounts of volume resistivity versus carbon nanostructure loading of composite materials according to the present disclosure.

With reference to FIG. 4, a graph 60 of volume resistivities of composite materials 20 with different amounts of linked nanostructures is shown. The horizontal axis shows the weight percent of carbon nanostructures (CNS) in the composite material 20. The vertical axis shows the volume resistivity of the composite material 20. The "volume resistivity" as used herein is an amount of electrical resistance for a unit length of the composite material 20, typically measured in ohm-centimeters (ohm-cm, $\Omega$-cm). A lower volume resistivity means that the composite material 20 is more electrically conductive. The graph 60 shows two plots of volume resistivities, a first plot 62 for composite materials 20 with a polypropylene as the polymer 22, and a second plot 64 for composite materials 20 with a clear paint as the polymer 22. To control the aerodynamic drag of the vehicle component 34, 54, the composite material 20 has a conductive network of linked nanostructures 24 such that the volume resistivity is below a specified threshold, e.g., $10^6$ $\Omega$-cm. In one form, the conductive network of linked nanostructures 24 are in an amount between 0.25 wt. % and 4.0 wt. %. Both plots 62, 64 illustrate a volume resistivity below $10^6$ $\Omega$-cm when the amount of linked nanostructures is between 0.25 wt. % and 4.0 wt. %.

Figure 5:
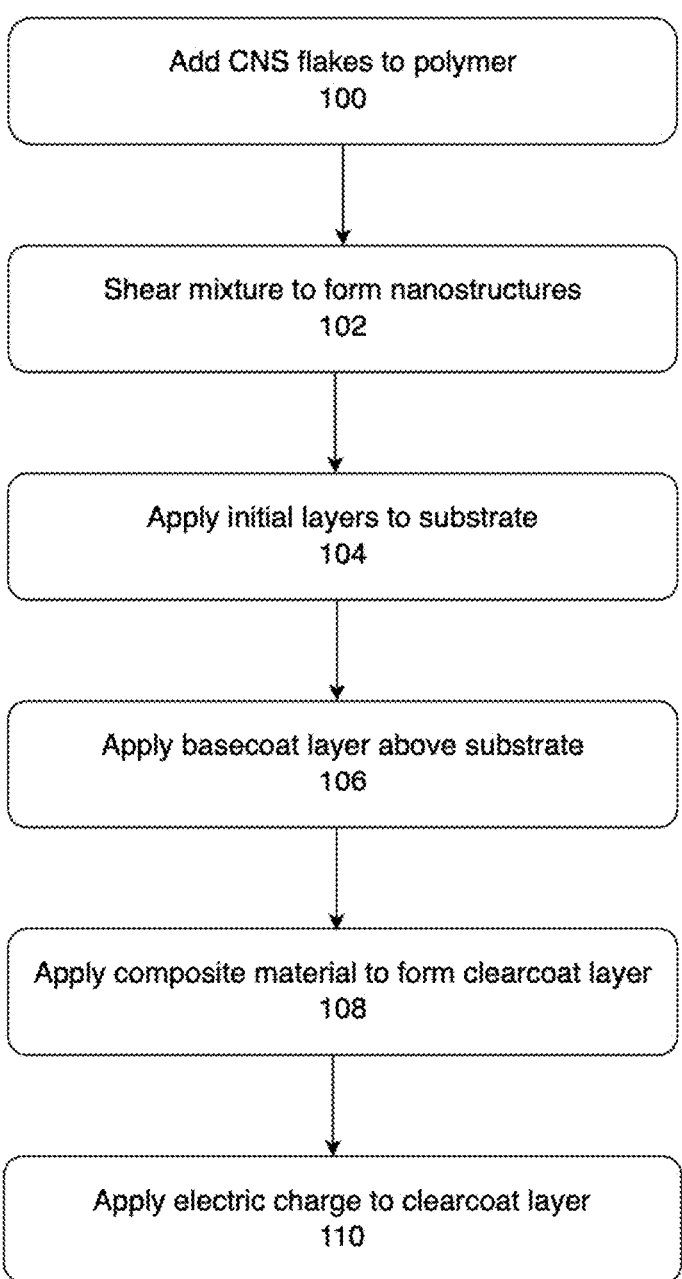
FIG. 5 is a block diagram of a manufacturing process to form a vehicle component according to the present disclosure.

With reference to FIG. 5, an example process for forming a vehicle component 34, 54, and operating the vehicle component 34, 54, is shown. The process begins in step 100, in which carbon nanotube flakes are added to a polymer 22. As described above, the carbon nanotube flakes are electrically conductive to apply a positive charge of a negative charge to a composite material 20 formed from the polymer 22 and the carbon nanotube flakes. It should be understood, however, that other forms of conductive fillers can be used to form the conductive network of linked nanostructures 24 and carbon nanotube flakes are merely exemplary and should not be construed as limiting the scope of the present disclosure.

Next, in step 102, the flake-polymer mixture is sheared to form a conductive network of linked nanostructures 24, which are carbon nanotubes 26 in this form. Low shear forces are applied to break the carbon nanotube flakes into nanotubes 26. Then, high shear forces are applied to distribute the nanotubes 26 throughout the polymer and to link the nanotubes 26 at nodes 28 into the conductive network of linked nanostructures 24.

Next, in a step 104, initial layers are applied to a substrate 36, 56. As described above, a corrosion protection layer 42 is applied when the substrate 36 is a metal. The corrosion protection layer 42 can include an E-coat material 48 and a phosphate layer 46. In another form, when the substrate 56 is a polymer or a composite material, the corrosion protection layer 42 can be omitted. A primer layer 44 can be applied to improve adhesion between the substrate 36, 56 and one or more of the other layers. In another form, when the vehicle component 34, 54 does not include initial layers, the block 104 may be omitted.

Next, in step 106, a basecoat layer 38 is applied above the substrate 36, 56. As described above, the basecoat layer 38 provides color and aesthetic texture to form a Class A surface finish. In one form, the basecoat layer 38 is a paint with metallic flakes. The basecoat layer 38 in one form is applied to a primer layer 44, as described above, to improve adhesion of the basecoat layer 38 to a layer beneath the primer layer 44.

Next, in step 108, the composite material 20 is applied to the basecoat layer 38 to form a clearcoat layer 40. As described above, the clearcoat layer 40 allows visible light to pass therethrough, such that the color and aesthetic texture of the basecoat layer 38 is visible through the clearcoat layer 40. In one form, the clearcoat layer 40 provides a shine or gloss effect to the Class A surface finish.

In operation, or during driving, in step 110 a controller 32 provides an electric current or voltage to induce an electric charge via electrical connections 50 to the clearcoat layer 40. As described above, the conductive network of linked nanostructures 24 conducts electricity from the electrical connections 50, and the electric charge determines whether the vehicle component 34, 54 has increased or decreased aerodynamic drag. The controller 32 is adjustable to apply a specified positive or negative charge to the clearcoat layer 40, the specified charge determined to control a specified amount of aerodynamic drag on the vehicle component 34, 54.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A motor vehicle body component comprising:
   a substrate;
   a basecoat layer disposed above the substrate;
   a clearcoat layer disposed on the basecoat layer, the clearcoat layer comprising a material having a conductive network of linked nanostructures, the conductive network of linked nanostructures configured to be in electrical communication with a controller and configured to receive a positive or negative electrical charge; and
   electrical connections, wherein the substrate and the clearcoat layer are electrically connected by the electrical connections,
   wherein the motor vehicle body component defines a Class A surface finish.

2. The motor vehicle body component according to claim 1, further comprising at least one corrosion protection layer disposed on the substrate and a primer layer disposed on the at least one corrosion protection layer, wherein the basecoat layer is disposed on the primer layer.

3. The motor vehicle body component according to claim 2, wherein the at least one corrosion protection layer comprises an electro-coat material.

4. The motor vehicle body component according to claim 3, wherein the at least one corrosion protection layer further comprises a phosphate layer disposed on the substrate, wherein the electro-coat material is disposed on the phosphate layer.

5. The motor vehicle body component according to claim 1, wherein the motor vehicle body component is selected from the group consisting of a spoiler, a hood, a roof header, side view mirrors, fenders, wheel lip moldings, a grille, fascias, a roof, a bumper, a leaf screen, and a rear tailgate cover.

6. The motor vehicle body component according to claim 1, wherein the clearcoat layer further comprises:
   a polymer matrix; and
   a polymer adhesive configured to adhere the conductive network of linked nanostructures to the polymer matrix.

7. The motor vehicle body component according to claim 6, wherein the polymer matrix comprises a polypropylene impact copolymer.

8. The motor vehicle body component according to claim 7, wherein the polypropylene impact copolymer is in an amount between 25-95 wt. %.

9. The motor vehicle body component according to claim 1, wherein the conductive network of linked nanostructures are in an amount between 0.25 wt. % and 4 wt. %.

10. A motor vehicle body component comprising:
   a substrate;
   a primer layer disposed above the substrate;
   a basecoat layer disposed on the primer layer;
   a clearcoat layer disposed on the basecoat layer, the clearcoat layer comprising a material having a conductive network of linked nanostructures, the conductive network of linked nanostructures configured to be in electrical communication with a controller and configured to receive a positive or negative electrical charge; and electrical connections, wherein the substrate and the clearcoat layer are electrically connected by the electrical connections, wherein the motor vehicle body component defines a Class A surface finish, and wherein the primer layer adheres the basecoat layer to a layer beneath the primer layer.

11. The motor vehicle body component according to claim 10, wherein the motor vehicle body component is selected from the group consisting of a spoiler, a roof header, side view mirrors, fenders, wheel lip moldings, a grille, fascias, a roof, a bumper, a leaf screen, and a rear tailgate cover.

12. The motor vehicle body component according to claim 10, wherein the clearcoat further comprises:

a polymer matrix; and a polymer adhesive configured to adhere the conductive network of linked nanostructures to the polymer matrix.

13. The motor vehicle body component according to claim 10, wherein the conductive network of linked nanostructures are in an amount between 0.25 wt. % and 4 wt. %.

14. A system for controlling airflow around a motor vehicle body component, the system comprising:

a controller; and the motor vehicle body component, the motor vehicle body component comprising:

a substrate;

a basecoat layer disposed above the substrate;

a clearcoat layer disposed on the basecoat layer, the clearcoat layer comprising a material having a conductive network of linked nanostructures in electrical communication with the controller and configured to receive a positive or negative electrical charge; and electrical connections, wherein the substrate and the clearcoat layer are electrically connected by the electrical connections, wherein the motor vehicle body component defines a Class A surface finish.

15. The system according to claim 14, further comprising at least one corrosion protection layer disposed on the substrate, the basecoat layer disposed on the at least one corrosion protection layer.

16. The system according to claim 14, wherein the motor vehicle body component is selected from the group consisting of a spoiler, a roof header, side view mirrors, fenders, wheel lip moldings, a grille, fascias, a roof, a bumper, a leaf screen, and a rear tailgate cover.

17. The system according to claim 16, wherein the positive or negative electrical charge is applied to create one of a downward force or an upward force on the motor vehicle body component.

18. The system according to claim 14, wherein the substrate is electrically conductive.

* * * * *